A. J. McDOWELL & D. T. BATES.
Street-Lamp.
No. 129,846. Patented July 23, 1872.
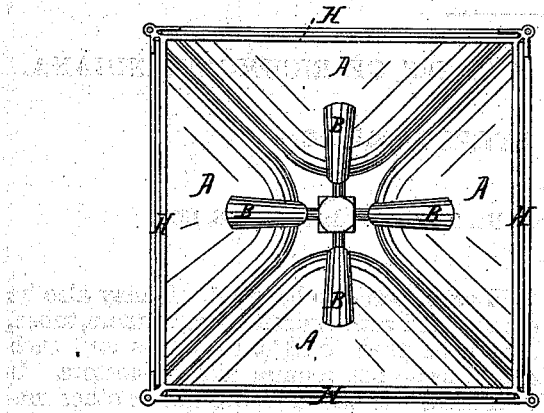
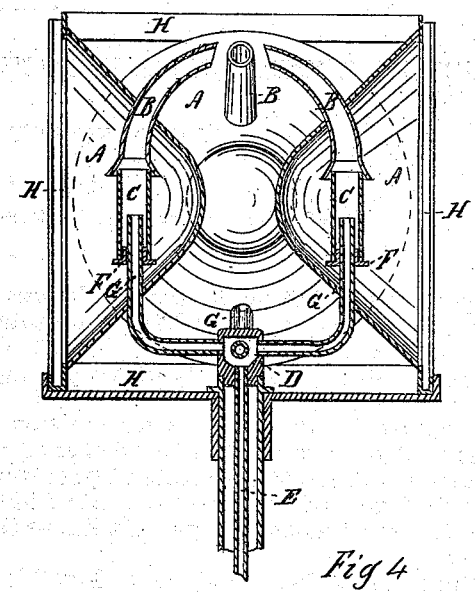
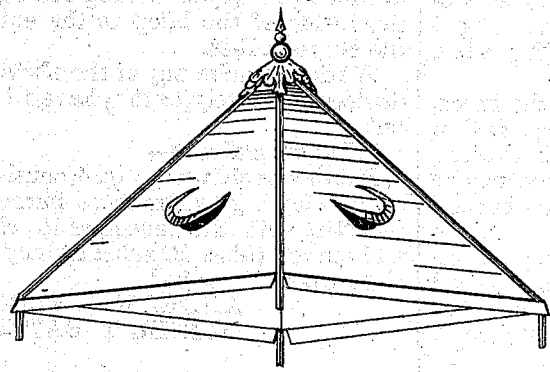
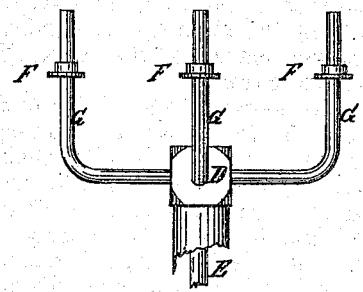
Witnesses.
John Bell
Ch. Hilgenberg
Inventor.
Andrew J. McDowell
Daniel T. Bates

UNITED STATES PATENT OFFICE.

ANDREW J. McDOWELL AND DANIEL T. BATES, OF RICHMOND, INDIANA.

IMPROVEMENT IN STREET-LAMPS.

Specification forming part of Letters Patent No. 129,846, dated July 23, 1872.

Specification describing certain Improvements in Reflecting Street-Lamps, invented by ANDREW J. McDOWELL and DANIEL T. BATES, of Richmond, county of Wayne and State of Indiana.

Our invention relates to the combination of a series of burners with a like number of reflectors and tubes, to constitute a street-lamp that shall give an increased amount of light with the same amount of gas or fluid, as the case may be.

Figure 1 is a plan or top view. Fig. 2 is a vertical section, showing the burners as connected with the chimneys and tubes. Fig. 3 is a view of the top of the lamp. Fig. 4 is a view of the burners.

A A are the reflectors. B B are the tubes, extending upward from the chimneys C C in curved form, in order to bring their extremities near together, that all the burners may be lighted at once as readily as a single burner. D is a head, to which the burners G G are attached, and is screwed onto the top of the lamp-post E. F are collars or disks attached to the burners G, and supporting the chimneys C in connection with the curved tubes B. H is the frame of the lamp.

This lamp may be used with any of the burning fluids or material by constructing the burners in such form as is adapted to the kind of fluid or material to be used. It may also be constructed with two reflectors, burners, tubes, &c., to be used to light up alleys and such places as do not require more reflectors. It is intended to use no more gas or other material in this lamp than in a lamp with a single burner, the amount of gas or other material being divided into two or more parts, according to the number of reflectors used. It is especially adapted to light small towns or villages where gas is not used. This lamp is as readily lighted as a lamp with a single burner by simply extending the lighter up on the inside of the lamp to the extremities of the curved tubes.

We do not claim any of the above-described devices separately, as they have all been used; but

What we claim is—

The device shown in Fig. 4, consisting of the head D having two or more burners, in combination with the reflectors A, chimneys C, and curved tubes B, substantially as and for the purpose described.

ANDREW J. McDOWELL.
DANIEL T. BATES.

Witnesses:
JOHN BELL,
CH. HILGENBERG.